United States Patent [19]

Diepers et al.

[11] 4,371,805

[45] Feb. 1, 1983

[54] ULTRASONIC TRANSDUCER ARRANGEMENT AND METHOD FOR FABRICATING SAME

[75] Inventors: Heinrich Diepers, Höchstadt; Bertram Sachs, Erlangen-Büchenbach, both of Fed. Rep. of Germany

[73] Assignee: Siemens Aktiengesellschaft, Munich, Fed. Rep. of Germany

[21] Appl. No.: 168,243

[22] Filed: Jul. 10, 1980

[30] Foreign Application Priority Data

Jul. 20, 1979 [DE] Fed. Rep. of Germany ....... 2929541

[51] Int. Cl.[3] ....................... H04R 17/06; G01S 15/00

[52] U.S. Cl. ....................................... 310/334; 73/632; 310/337; 367/155

[58] Field of Search .................. 73/632; 310/334, 335, 310/336, 337; 367/155; 29/25.35; 340/10

[56] References Cited

U.S. PATENT DOCUMENTS

| | | | |
|---|---|---|---|
| 2,700,895 | 2/1955 | Carson | 310/336 |
| 2,844,809 | 7/1958 | Batchelder | 310/337 |
| 3,329,408 | 7/1967 | Branson | 310/334 |
| 3,979,711 | 9/1976 | Maginness | 367/155 |
| 4,211,948 | 7/1980 | Smith et al. | 310/334 |

*Primary Examiner*—J. D. Miller
*Assistant Examiner*—D. L. Rebsch
*Attorney, Agent, or Firm*—Kenyon & Kenyon

[57] ABSTRACT

In an ultrasonic transducer arrangement having a plurality of ultrasonic oscillators, the ultrasonic oscillators each consist of a matrix of column shaped transducer elements, which are arranged in columns and rows. A planar array which can be addressed separately is formed from a matrix of such ultrasonic oscillators. This array permits focussing of the radiated sound in its longitudinal as well as transversal direction.

5 Claims, 3 Drawing Figures

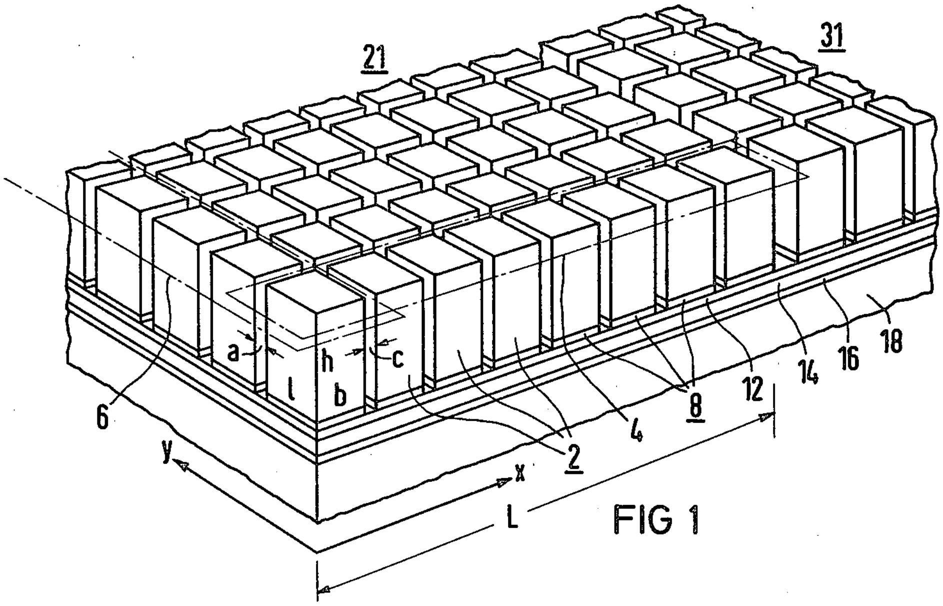
FIG 1
FIG 2
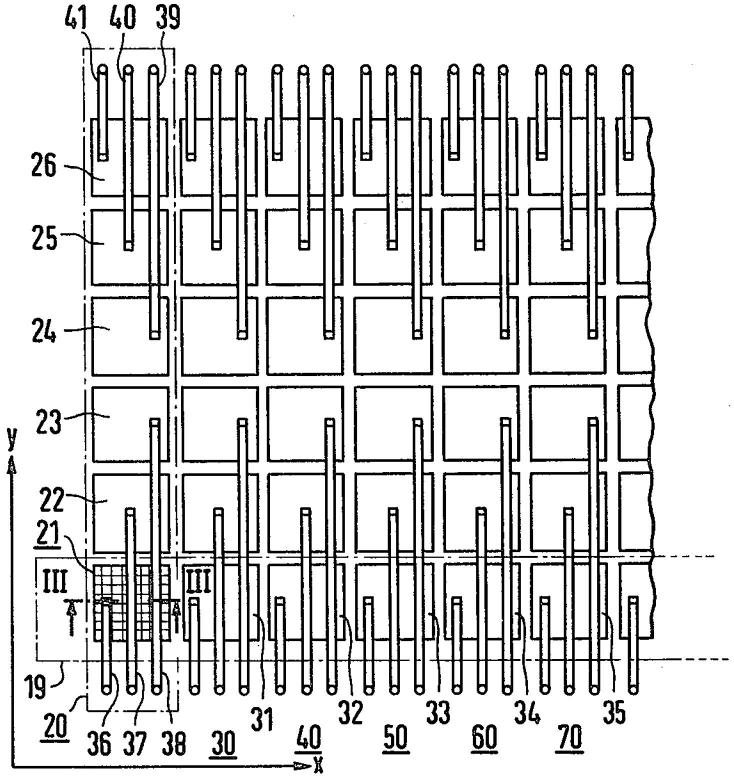

ULTRASONIC TRANSDUCER ARRANGEMENT AND METHOD FOR FABRICATING SAME

BACKGROUND OF THE INVENTION

This invention relates to ultrasonic transducers in general and more particularly to an ultrasonic transducer arrangement with a matrix of ultrasonic oscillators consisting of several acoustically separated transducer elements which are electrically controlled together.

An ultrasonic transducer arrangement of this general nature is disclosed in German Pat. No. 28 29 570. In nondestructive material testing, images from the interior of a body to be examined are produced by means of ultrasonic pulses which are emitted by a transducer element arranged at the surface of the body. From the travelling time of the ultrasonic signal and the echo signal, the location of a fault can be derived. The ultrasonic transducer arrangement in the form of a so-called array consists of a multiplicity of ultrasonic oscillators with transducer elements of piezo material which are arranged at a close spacing of, for instance, about 50 to 70 μm side by side. The transducer elements are controlled jointly. The entire array may consist, for instance, of about 54 ultrasonic oscillators which are divided by so-called fine division into several transducer elements which are electrically controlled together. By means of this fine division, the transversal vibration of the transducer elements which is also emitted is shifted to higher frequencies and its influence on the resolution is thereby reduced accordingly. Several oscillators of the array can be combined in an oscillator group.

This fine division of the ultrasonic oscillators in the longitudinal direction is in general accomplished mechanically by sawing. Since the height of the transducer elements must not substantially exceed one-half the wavelength of the ultrasonic pulses, the height of the transducer element is also limited accordingly for higher frequencies, for instance, above 10 MHz. The width of the saw gap between the separating surfaces of the transducer elements, however, cannot fall below a predetermined value since sufficient mechanical strength of the saw blades must be ensured. Through this increase of the gap width relative to the areas, the cutting losses are increased accordingly. The radiation per unit area is thereby reduced.

For the operation of ultrasonic equipment for producing what are called B displays in the frequency range of about 2 to 8 MHz, four linear arrays are used as ultrasonic antennas. The arrangement of the oscillators in the longitudinal direction of the array, which is, at the same time, the scanning direction of the emitted ultrasonic pulses, makes possible electronic focusing of the ultrasonic pulses through propagation time delay. Focusing perpendicularly to the scanning direction is possible only with a mechanical focus, for instance, by placing an acoustical cylindrical lens in front. A fixed frequency is assigned to the individual arrays. With mechanical focus, however, adjustment to different depths is possible only at relatively high costs. For operation with different frequencies, several arrays are threrefore also necessary.

To obtain better imaging conditions, mixed operation with two frequencies has already been carried out with linear arrays. In a known device, the compromise between sensitivity and bandwidth has been circumvented through the use of two arrays for different frequencies, for instance, 1.5 MHz and 2.5 MHz, which are arranged side by side (IEEE Transactions on Sonics and Ultrasonics, vol. SU-25, no. 6, Nov. 78, pages 340 to 345). Also in this device, a fixed frequency is assigned to each individual array.

It is therefore an object of the present invention to provide an ultrasonic transducer arrangement, the frequency of which is freely selectable within a certain range and with which better imaging conditions, particularly increased resolution, are obtained in the production of images of a scanned space. With a special embodiment of the arrangement, electronic focusing in the longitudinal direction, as well as in the transverse direction of the arrangement, should also be possible.

SUMMARY OF THE INVENTION

According to the present invention, the stated problem is solved in an ultrasonic transducer arrangement of the kind mentioned at the outset of using ultrasonic oscillators, each of which include a matrix of column-like transducer elements arranged in columns one behind the other and in rows side by side. The column shaped transducer element of square, rectangular or even round cross section, the height of which is preferably about twice as large as the width or the diameter, respectively, in order to suppress interfering low-frequency transversal vibrations, preferably consists of a piezoelectric material of low Q, i.e., strong internal damping. The pulse therefore has a correspondingly wide characteristic and the ultrasonic oscillator has approximately constant selectivity in a relatively wide frequency range. A suitable material for such wide band transducer elements is, for instance, lead metaniobate $Pb(NbO_3)_2$ or also lead zirconate-titanate $Pb(Zr,Ti)O_3$, which in general is called PZT.

The arrangement with the additional fine division parallel to the longitudinal direction of the array is obtained, for instance, by fastening a metallized oscillator platelet to a strongly adhering substrate and finely dividing it into strips first parallel to the longitudinal edge, i.e. in the transversal direction. Subsequently, a common electronic contact, for instance, a metal foil or a metallized plastic foil is soldered to the upper end faces, and the fine division in the longitudinal direction is made after the transducer elements are fastened on a damping body.

In a special embodiment of the arrangement, the strips produced by the fine division are arranged at a very small distance from each other, so that the gap produced by the separation practically disappears. A thin plastic spacer a few μm thick can preferably be used as a separator. The transducer element can be polarized before the oscillator platelet is divided up or also after the transducer elements are fastened on the common electronic contact.

A planar, two-dimensional array is produced by forming a matrix of ultrasonic oscillators from rows and columns.

The transducer elements of the entire arrangement are, in general, connected to each other in an electrically conducting manner at one end face. The respective transducer elements of the ultrasonic oscillators arranged side by side in a row may be connected at their outer end face to a common electrical control terminal. In a special embodiment of the transducer arrangement, each ultrasonic oscillator is connected to a separate control terminal, which can preferably be realized as a conductor run on an insulating intermediate layer. This embodiment allows electronic focusing through propagation time delay in the longitudinal direction as well as in the transversal direction of the array.

BRIEF DESCRIPTION OF THE DRAWINGS

FIG. 1 is a perspective view of part of an ultrasonic transducer arrangement according to the present invention.

FIG. 2 shows a partial plan view of a planar array.

DETAILED DESCRIPTION OF THE INVENTION

Figure 3:
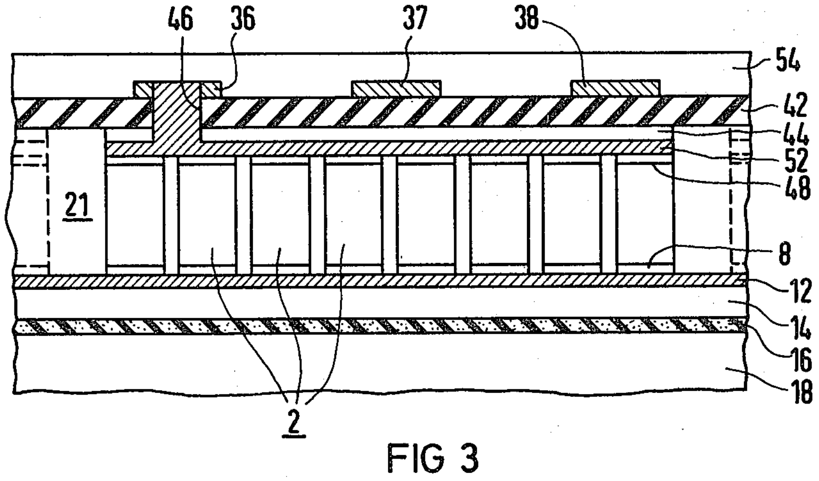
FIG. 3 is a cross section through part of FIG. 2.

According to FIG. 1, a matrix of 64 transducer elements which are arranged in eight columns 4 and eight rows 6, forms an ultrasonic oscillator 21. On their lower end faces, the transducer elements 2 are provided with a metallization 8 which may consist, for instance, of an alloy containing chromium, platinum and gold or also of chromium and gold as well as of nickel-chromium. The ultrasonic transducers 2 are fastened by means of a layer of solder 12 to a metal foil 14 which may consist, for instance, of silver, and forms a common electrical connecting conductor for all transducer elements of the entire transducer arrangement. The metal layer 14 is fastened by means of a layer of adhesive 16 to a damping body 18. The electrical conductor of the ultrasonic oscillator 21 connected to the upper end faces of the transducer elements is not shown in the figure. Several such oscillators which are arranged side by side and of which only some transducer elements of a further oscillator 31, not designated specifically, are indicated, may, for instance, form a linear array of ultrasonic oscillators.

If in this embodiment with transducer elements 2, for instance, with a height h=600 μm and the width b=300 μm as well as with a length l=300 μm, the columns 4, which are made first, are arranged as strips extending over the entire array with a very small spacing from each other, for instance, a=2 to 20 μm and preferably 4 to 8 μm, then the gap width c is substantially filled out and is practically made effective for the array.

In a special embodiment, the transducer arrangement according to FIG. 2 may consist, for instance, of a matrix of 324 oscillators which are arranged in columns 19 and rows 20, each containing a matrix of 64 transducer elements, as is indicated in the ultrasonic oscillator 21 as an illustration, although the individual transducer elements are not visible in the practical embodiment of the arrangement. The columns, of which only the first one is indicated by dash-dotted encircling and is designated with 19, then contain, for instance, 54 ultrasonic oscillators each, and the lines 20 contain 6 ultrasonic oscillators each.

The transducer elements may preferably consist of PZT ceramic of low Q, for instance, Q=20. If such wideband oscillators are used, the transducer elements of the individual ultrasonic transducers can be driven sequentially with two or more different frequencies. In this manner the near-far field boundary, designated as a natural focus, can be shifted in a simple manner, by an electronic choice of the magnitude of the two-dimensional oscillator field, optimally to the depth of an object to be examined. This is particularly advantageous if the focusing is done electronically, because the focal point can be placed in the near-far field boundary or closer by.

In the embodiment of an ultrasonic transducer arrangement in the form of a matrix, the ultrasonic oscillators 21 to 26 of the individual rows 20, 30, 40, 50, 60 and 70 can each be provided with a common control terminal. In this embodiment the oscillators of each row are then also controlled jointly. The respective ultrasonic oscillators of several adjacent rows, for instance, always six rows, can be combined in a group and are scanned sequentially in the x-direction.

In the special embodiment of the matrix according to FIG. 2, the individual oscillators 21 to 26 of each of the rows 20 are provided with separate connecting leads, which are designated as 36 to 41 in the figure for the oscillators of row 20. Similarly, the individual oscillators of the other rows are each provided with a connecting lead, not specifically designated in the figure. In this embodiment of the transducer arrangement as a matrix, electronic focusing is possible in the x-direction as well as electronic focusing in the y-direction. This embodiment has the further advantage that an "electronic magnifier" can be realized. With a sufficiently large array and sufficient line density, an object can be scanned, for instance, coarsely in a first step, i.e. with a larger spatial spacing of the volume elements. In a second step, a detected fault can than be observed in greater detail in its general area with increased line density and with reduced line density in the area surrounding it with the total number of lines being held constant. The two-dimensionally formed focus can be fixed onto this area, and additional optimization is then accomplished by the choice of the frequency. Since simultaneously, the environment of the fault, i.e. the area surrounding the fault is scanned coarsely, the overview is also always retained.

For fabricating an ultrasonic transducer arrangement according to FIGS. 1 and 2, a flat body of piezoelectric material, the thickness of which is at least approximately equal to the height h of the transducer elements 2, is metallized on both sides and is then has one of its flat sides detachably fastened on a substrate. Subsequently the body is finely divided in its longitudinal direction, i.e. by cuts parallel to the x-direction according to FIG. 1. The columns 4 so produced as strips are then connected to each other by connecting their other flat side to a common metal substrate 14, for instance, by means of the layer of solder 12. This metal overlay 14 is then fastened to the damping body 18, for instance, by means of the adhesive layer 16. Then, the strip-shaped body is separated from its original working substrate, which is now on the top side of the matrix. Subsequently, the fine division in the transverse direction, i.e. parallel to the y-direction, is made and the matrix of the transducer elements 2 is produced. With the fine division, the metallization of the piezoelectric body is also separated to produce the individual metal layers 8, the lower ones of which are shown in FIG. 1, at the end faces of the transducer elements.

The metal overlay 14 acting as a common electric connecting lead for all transducer elements should preferably consist of metallized plastic foil, especially of metallized polymide (Kapton), the thickness of which may be, for instance, about 2 to 10 μm.

The entire oscillator panel according to FIG. 2, the ultrasonic oscillators of which each consist of a matrix of transducer elements 2, can also be produced by lining up the strips, which were made by finely dividing the metallized flat body in the longitudinal direction, i.e. parallel to the x-direction, and the width of which strips is equal to the length l of the transducer elements 2, with their separating surfaces at very small spacings from each other, and by connecting them to each other in an electrically conducting manner on one flat side using the metal overlay 14. Then, the metal overlay 14 is fastened to the dampening body 18, and subsequently the fine division of the strips in the transverse direction is made, i.e., cuts parallel to the y direction spaced at a distance b equal to the width of the transducer elements 2. Since this fine division is made by saw cuts, the spacing c of the transducer elements 2 from each other is always at least as large as the width of the saw blade, which for reasons of mechanical strength cannot be less than a predetermined thickness. With a distance c of, for instance, 70 μm and a width b of the elements 2 of, for instance, about 300 μm, a square area of the transducer elements 2 with a length l of, for instance, about 3 mm, is obtained. the distances a in the y direction however, i.e. the spacings between the transducer elements parallel to the x direction according to FIG. 1, can be maintained substantially smaller by the stacking technique of the strips. For instance, they can be only about 5 μm and will in general not substantially exceed 10 μm. The dimension of the oscillators 21 in the y direction according to FIG. 1 is correspondingly smaller.

The spacings between the individual oscillators 21 to 26 and 31 to 35 are shown enlarged for illustration purposes and not specifically designated in FIG. 2. These spacings may, however, correspond to the saw gap spacings of the subdivisions. In the practical embodiment, these spacings are preferably kept as small, for instance, by the stacking technique, as the spacings between the individual transducer elements 2 of the ultrasonic oscillators.

The matrix of transducer elements can furthermore also be produced by cutting the flat body of piezoelectric material which is metallized on both flat sides, first into strips with the length l of the transducer elements and by subsequently separating these strips into sections, the length of which is equal to the width b of the transducer elements 2. Then the column-like transducer elements 2 so produced are lined up with very little space between their separating surfaces in the x as well as in the y direction and are fastened to a metal substrate which is then placed on the damping body. With this stacking technique, the spaces c between the transducer elements 2 as per FIG. 1 can also be kept very small.

In the fabrication of the ultrasonic oscillator by this method, it is advantageous to make one of the metallizations at the end faces of the transducer elements 2 of ferromagnetic material. Then, the individual transducer elements 2 can be transferred by means of magnetic forces to the metal overlay 14. The individual, already completed, transducer elements 2 can also be transferred, however, for instance, by means of an adhesive tape.

As an alternative, the transducer elements 2 can be lined up directly, in abutting relation, as a matrix on an expandable working substrate. Subsequently, the minimum spacing required for de-coupling is produced by stretching the working substrate. In some cases it may be advantageous to choose the metal overlay 14 which serves as the common electrical contact, or also the metallization of a plastic foil, as the working substrate.

In the special embodiment of the transducer arrangement according to FIG. 2 with separate addressing of the individual ultrasonic oscillators, the transducer elements 2 are provided, according to FIG. 3, with a common connecting lead, for instance, the metal overlay 14 on one end face, while on the opposite end face only the transducer elements of the matrix of the respective ultrasonic oscillator 21 are provided with a connecting lead, which may preferably be in the form of a conductor run. For this purpose, a common covering 42 which may consist, for instance, of plastic, especially polymide (Kapton) is provided with a metallization 44 on its lower flat side in the area of the matrix of the oscillator 21. Metallization 44 may consist, for instance, of a chromium-silver alloy. This metallization can preferably be vapor deposited on the foil. In the area of the ultrasonic oscillator 21, the covering 42 has an opening 46. Subsequently, the upper flat side of the covering 42 is provided with conductor runs which represent the connecting leads 36, 37 and 38. One of these conductor runs always leads to one of the openings in the covering 42 and thereby establishes the electrical connection with a control line, not shown in detail. The metal overlay 44 can then be provided with a layer of solder 52 which is preferably vapor deposited, and the covering 42 with the connecting leads 36 to 38 is fastened by means of this solder layer 52 to the metal overlays 48 of the transducer elements 2. Instead of the layer of solder 52, an electrically conductive adhesive, a so-called conduction adhesive, can also be used for fastening the covering 42 with the conductor runs to the transducer elements 2. An impedance matching layer 54 is disposed over the conductor runs and the covering 42. Impedance matching layers act to bridge or "match" the large difference in wave resistance between surfaces of the oscillator and the work piece and thereby reduce or prevent reflections.

For preparing the conductor runs 36 to 38, the entire upper flat side of the covering 42 can, for instance, be provided with a metal overlay, from which the portions not required for connecting leads are then removed, for instance, by means of a photo etching technique. The conductor runs of the connecting leads 36 to 38 can also be applied to the surface of the covering 42 by a mask technique.

In the embodiment of the ultrasonic transducer arrangement with individually controllable oscillators according to FIG. 2, which are finely divided in the x and y directions, several rows, for instance, the oscillators of six succeeding rows 20, 30, 40, 50, 60 and 70 can be combined in one oscillator matrix by controlling the oscillators. This matrix can then be scanned linearly in the x direction over the entire oscillator panel for building up an image line sequence. Thereby, electronic focusing can additionally be achieved in the transversal direction through the propogation time delay of the echo pulses or of the echo and transmitting pulses in the x as well as in the y direction.

In the illustrated embodiment, the common connecting lead 14 serving as the countercontact is arranged on the lower side of the transducer elements 2. However, this common countercontact can also be provided on the upper side of the transducer elements 2. In such an embodiment, the connecting leads for individual ultrasonic oscillators are then arranged between the transducer element and the damping body 18.

What is claimed is:

1. In a ultrasonic transducer arrangement with a plurality of ultrasonic oscillators, each formed by a plurality of transducer elements which are mechanically separated from each other by fine division and are electrically controlled together, the improvement comprising:

a. the ultrasonic oscillators each including a matrix of column-like transducer elements which are arranged in columns one behind the other and in rows side by side;

b. the oscillators arranged in columns and rows;

c. a common electrical connecting lead connected to one end face of all transducer elements, the other end face of the transducer elements of each individual ultrasonic oscillator provided with a common electrical connection which is connected to a connecting lead, one lead thereby being provided for each individual ultrasonic oscillator; and d. said common electrical connection for each individual oscillator comprising a metal coating on a plastic covering which covers the free end faces of the transducer elements, one of said metal coatings formed in the area of the matrix of each individual ultrasonic oscillator, said covering having an opening for each oscillator, and each connecting lead comprising a conductor run on top of said plastic cover and extending through the opening for an associated oscillator into contact with said metal coating.

2. The improvement according to claim 1, wherein said metal coatings comprise metal overlays on one flat side of said covering adjacent the transducer elements associated with each oscillator and wherein the other flat side of said covering has formed thereon conductor runs which serve as said electric connecting leads, said leads connected through respective ones of said openings to said metal overlays on said other flat side, the metal overlays on said one side connected to the end faces of the transducer elements of their respective oscillators in an electrically conducting manner and further including an impedance matching layer covering said other flat side.

3. The improvement according to claim 2, comprising a layer of solder forming an electrically conducting connection between said metal overlays and the transducer elements.

4. The improvement according to claim 1 wherein the mutual spacing of said transducer elements is about 2 to 20 $\mu$m.

5. The improvement according to claim 4, and further including an electrically insulating spacer arranged between the individual transducer elements.

* * * * *